(No Model.)
E. NORTON.
SHEET METAL CAN.
No. 460,216. Patented Sept. 29, 1891.
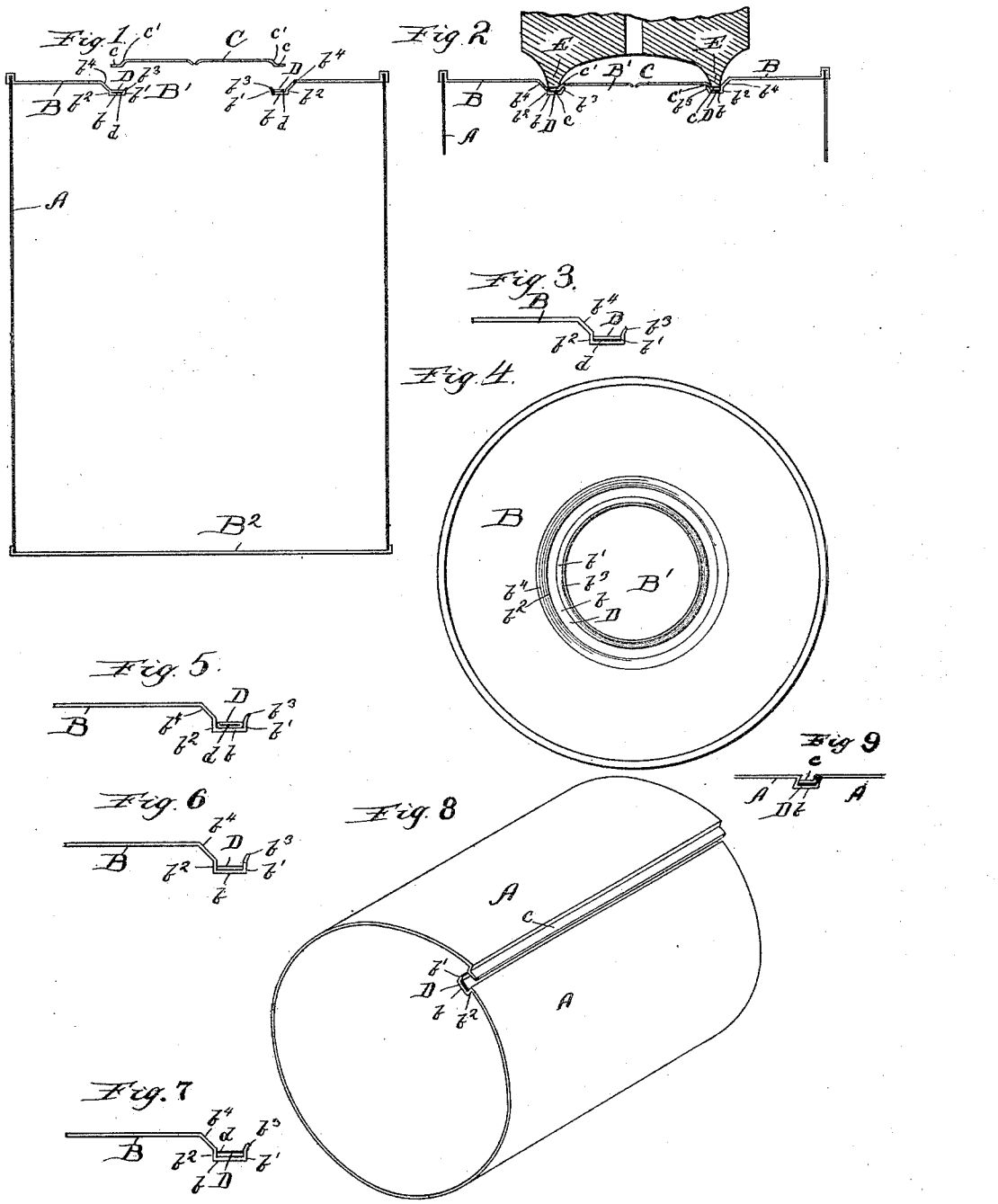
Witnesses:
Sew. C. Curtis.
A. M. Munday
Inventor:
Edwin Norton
By Munday, Evarts & Adcock.
His Attorneys.

UNITED STATES PATENT OFFICE.

EDWIN NORTON, OF MAYWOOD, ASSIGNOR TO HIMSELF AND OLIVER W. NORTON, OF CHICAGO, ILLINOIS.

SHEET-METAL CAN.

SPECIFICATION forming part of Letters Patent No. 460,216, dated September 29, 1891.

Application filed February 8, 1890. Renewed August 8, 1891. Serial No. 402,083. (No model.)

*To all whom it may concern:*

Be it known that I, EDWIN NORTON, a citizen of the United States, residing in Maywood, in the county of Cook and State of Illinois, have invented a new and useful Improvement in Sheet-Metal Cans, of which the following is a specification.

My invention relates to improvements in the construction of sheet-metal cans which require to be hermetically sealed, and are used for preserving fruits and other articles. My invention relates more particularly to the construction or means whereby the cap which closes the opening through which the can is filled is soldered in place.

In these cans as heretofore constructed the upper head is furnished with a stud-hole or opening having a V-shaped groove surrounding the opening to afford a seat for the downwardly-projecting flange or ring of the can-cap. To solder the cap in place, it is necessary to fill or partially fill this V-shaped groove with solder, and for this reason a comparatively large amount of solder is required for soldering the caps in place.

The object of my invention is to provide a means or construction of can whereby the caps may be securely soldered in place with a much less amount of solder, and whereby a better and stronger seam may be secured, and whereby also the soldering operation may be effected with greater ease and facility, and whereby the tin surface of the can-groove may be protected from dirt or discoloration, which is liable to interfere with the subsequent soldering operation.

To these ends my invention consists in providing the can-head with a flat or nearly flat bottomed cap-groove, having upwardly-projecting sides or walls to retain the solder, and the can-cap with a corresponding horizontal flange or rim adapted to fit flat in the bottom of the cap-groove, so that a minimum amount of solder may be required to flow over the flange of the can-cap and embed it in the solder and properly solder it to the bottom of the cap-groove, and securing in the flat-bottom cap-groove the requisite amount of solder for forming the seam at the time the can is manufactured or before it is filled, so that the solder will be readily distributed around the circumference of the seam, and at the same time act as a protection or cover for the tin surface of the cap-groove, with which the solder is to unite. The solder is preferably applied in the form of a thin flat strip, in width corresponding to the flat bottom of the cap-groove. The solder-strip should preferably be in the form of a ring extending entirely around or almost entirely around the cap-groove. The solder-strip may be formed by wrapping a solder-wire around a mandrel of a diameter corresponding to that of the cap-groove, and then flattening the solder-wire ring thus formed by placing it under a die or hammer. The solder-strip may also be formed by cutting a ring from sheet-solder or in any other suitable manner. The flat-bottom cap-groove is provided with upwardly-projecting walls, which serve to retain the solder-strip in place frictionally and to keep the solder from flowing away or into the can when it is melted during the soldering operation. The flux, preferably in the form of powdered rosin, though it may be put on in a melted or liquid form, is applied to the bottom of the cap-groove before the solder-strip is secured therein. If the flux or rosin is applied in a melted form, it may be placed in the cap-groove after the solder-strip has been first placed therein. The preferable way of practicing my invention, however, is to deposit the rosin in a powdered form in the cap-groove first, and then apply the solder-strip, which will thus serve to retain the rosin in place, as well as to protect the surface of the tin in the bottom of the cap-groove. Where the solder-strip is formed by wrapping the solder-wire around a mandrel to shape it into ring form and afterward flattened I ordinarily prefer to employ for this purpose what is commonly known to those skilled in the art as "rosin-core solder-wire," the same being shown and described in Letters Patent No. 400,869, of April 2, 1889. This rosin-core wire contains within it a core of rosin or other flux in sufficient quantities to flux the seam to be soldered and makes a very convenient method of simultaneously applying both the solder and the flux to the joint.

In the accompanying drawings, which form a part of this specification, and in which similar letters of reference indicate like parts, Figure 1 is a central vertical sectional view of a can embodying my invention. Fig. 2 is a similar view after the cap has been soldered in place. Fig. 3 is an enlarged detail view of the flat-bottom cap-groove, and Fig. 4 is a top or plan view. Fig. 5 shows the same where the flux or rosin is contained within the solder-strip, the solder-strip being formed from rosin-core solder-wire. Fig. 6 is a similar view where the flux is omitted. Fig. 7 is a similar view showing the flux or rosin applied after the solder is secured within the cap-groove. Fig. 8 illustrates the application of the invention to the side seams of can-bodies, and Fig. 9 is a sectional view showing the upright walls of the groove inclined to retain the solder-strip.

In the drawings, A represents the can-body; B, its upper head, having the stud-hole or filling-opening B', and $B^2$ is the bottom or lower head of the can.

C is the cap which is designed to close the stud-hole or opening B'. Surrounding the opening B' is a flat-bottom cap-groove $b$, having upright or nearly upright walls $b'$ $b^2$, so that these walls will serve to frictionally retain the solder-strip D within the cap-groove. The inner wall $b'$ has an inward curve $b^3$, and the outer wall $b^2$ has a flaring rim $b^4$, connecting with the main surface of the can-head B. The can-cap C has a horizontal rim or flange $c$, which fits flat upon and conforms to the bottom $b$ of the cap-groove, so that the parts $c$ and $b$, which are to be soldered together, will fit flat and close one upon another in order that the depth of solder which will cover the raw or cut edge of the rim $c$ of the can-cap will also suffice to cover or flow over the entire flange or rim $c$ and embed it in the solder and properly and securely unite the can-cap C and head B together. By this means I effect a great saving in the amount of solder required—fully one-half as I estimate it—and at the same time produce a very perfect and strong joint, as the entire rim or flange of the can-cap is embedded in or carried by the solder. The can-cap C has a depending rim or flange $c'$, corresponding to and fitting the inward rim or flange $b^3$ of the cap-groove in the head B. The purpose of the flaring rim or member $b^4$ is to give proper body to the soldering-tool which fits in the cap-groove. The operating-edge of the soldering-tool is indicated at E in the drawings. An annular tool is preferably employed.

$d$ indicates the flux or rosin. The flux or rosin may be retained in place by the solder-strip or ring either by being contained within the solder-strip, as indicated in Fig. 5, or it may be retained between the solder-strip and the bottom of the cap-groove, as indicated in Figs. 1 and 3, or it may be applied in the form of a coating, as indicated in Fig. 7.

In Fig. 8 the invention is shown as applied to the formation of the side seam of the can-body. In this case the flat-bottomed groove $b$ is formed in one edge of the can-body A, and its opposite edge is furnished with the flat rim $c$, which fits therein and is to be soldered thereto.

In Fig. 9 one of the upright walls of the flat-bottomed groove $b$ is shown somewhat inclined to form a kind of dovetail to better secure the solder-strip in place. One or both of the upright walls may be thus dovetailed or inclined. The bottom $b$ of the groove I term "flat" to indicate that it is or should be substantially flat or level at the time the soldering is done, so that a minimum quantity of molten solder when flowed into the groove will suffice to flow over or cover the rim in flange $c$. To attain the best and most economical results, the bottom of the groove should be substantially flat, as shown. Its shape may, however, be varied or slightly curved so long as the upright walls of the groove serve to retain the solder and cause a small quantity to flow over the flange $c$.

I claim—

1. A can furnished with a head having an opening and a flat-bottomed cap-groove surrounding such opening and provided with upright walls, a thin flat strip of solder fitting in said cap-groove and secured therein by frictional contact with the upright walls thereof, and a can-cap having a flat rim $c$, substantially as specified.

2. The can-head having a filling-opening and a flat-bottomed cap-groove surrounding such opening and provided with upright walls, and a thin flat solder-strip secured in such groove by frictional contact with its walls, such groove being also furnished with a flux or rosin retained in place by said solder, substantially as specified.

3. The can-head having a filling-opening and a flat-bottomed cap-groove surrounding such opening and provided with upright walls, a thin flat solder-strip secured in such groove by frictional contact with its upright walls, substantially as specified.

4. The blank of tin-plate having a flat-bottom groove $b$ and upright walls containing solder, secured therein by frictional contact with the upright walls thereof, and a corresponding flange $c$, adapted to fit in said groove and be soldered thereto by the solder contained therein substantially as specified.

5. The combination, with a blank of tin-plate having a groove consisting of a bottom and two upright solder-retaining walls, of a solder-strip contained in said groove by frictional contact with its upright walls, said groove being furnished with a powdered flux held in place by said solder-strip, substantially as specified.

6. The combination of a blank of tin-plate having a groove consisting of a bottom and two upright solder-retaining walls, and a solder-strip contained in said groove, one of the upright walls of said groove being inclined to form a dovetail pocket for said strip, substantially as specified.

EDWIN NORTON.

Witnesses:
EDMUND ADCOCK,
H. M. MUNDAY.